United States Patent
Beyda et al.

(10) Patent No.: US 9,919,245 B2
(45) Date of Patent: Mar. 20, 2018

(54) FLUID FILTER APPARATUS

(71) Applicant: TOWN & COUNTRY LINEN CORP., New York, NY (US)

(72) Inventors: Jeffrey Beyda, Brooklyn, NY (US); Gina Barnaba, Scarsdale, NY (US); Louis Francis Henry, Scarsdale, NY (US); Christopher Mellen, Yonkers, NY (US); Zhenguo Lin, Fujian (CN); Qinghong Yin, Fujian (CN); Linhai Que, Fujian (CN); Xiaoyuan Xie, Fujian (CN); Joy Mangano, Ronkonkoma, NY (US)

(73) Assignee: Town & Country Linen Corp., New York, NY (US)

(*) Notice: Subject to any disclaimer, the term of this patent is extended or adjusted under 35 U.S.C. 154(b) by 371 days.

(21) Appl. No.: 14/695,794

(22) Filed: Apr. 24, 2015

(65) Prior Publication Data
US 2016/0310881 A1 Oct. 27, 2016

(51) Int. Cl.
*C02F 1/00* (2006.01)
*B01D 29/085* (2006.01)

(52) U.S. Cl.
CPC .......... *B01D 29/085* (2013.01); *B01D 23/28* (2013.01); *C02F 1/003* (2013.01); *B01D 2201/0407* (2013.01)

(58) Field of Classification Search
CPC .. C02F 1/002; C02F 1/003; B01D 2201/0407; B01D 2201/31; B01D 2201/301; B01D 27/08; B01D 27/108; B01D 25/002; B01D 29/004; B01D 29/03; B01D 29/05; B01D 29/085; B01D 35/28; B01D 35/30; B01D 35/34; B01D 23/28; A47J 19/005; A47J 43/22; A47J 43/24
See application file for complete search history.

(56) References Cited

U.S. PATENT DOCUMENTS

| | | | |
|---|---|---|---|
| 2,896,788 A * | 7/1959 | Hoffberger | A47J 43/22 210/473 |
| 6,103,116 A * | 8/2000 | Koslow | A47J 31/06 210/282 |
| 6,368,504 B1 | 4/2002 | Kuennen et al. | |
| 7,396,461 B2 | 7/2008 | Bommi et al. | |
| 2004/0159596 A1* | 8/2004 | Mitchell | B01D 39/1623 210/94 |
| 2006/0096929 A1* | 5/2006 | Repp | A47J 19/00 210/740 |
| 2014/0175005 A1* | 6/2014 | Bradford | C02F 1/003 210/474 |
| 2016/0159662 A1* | 6/2016 | Clinch | B01D 63/081 426/495 |

* cited by examiner

*Primary Examiner* — David C Mellon
(74) *Attorney, Agent, or Firm* — Leason Ellis LLP (57) ABSTRACT

The present invention is directed to a collapsible filter apparatus. The collapsible filter apparatus includes an expandable top fluid retention portion, a filter portion and a collapsible funnel portion. These elements are joined to one another so as to provide fluid in need of filtering an expanded receptacle that can be collapsed for storage and transport.

20 Claims, 10 Drawing Sheets

FLUID FILTER APPARATUS

FIELD OF THE INVENTION

The present invention is directed to a fluid filtering apparatus. Furthermore, the present invention is directed, in part, to a collapsible fluid filtering apparatus that in its expanded configuration, allows for the retention of significant volumes of fluid for filtering, and is its collapsed configuration, presents smaller dimensions suitable for individual transport or storage.

BACKGROUND OF THE INVENTION

In many circumstances, filters provide treated water to users, either for direct consumption or for later storage. In particular configurations, water filters equipped with storage receptacles can provide a reservoir of pre-filtered water for use by individuals. Conversely, water filters affixed to faucets and other outputs are equipped to provide a continuous stream of filtered water to a user for immediate consumption or use. However, conventional water filters suffer from numerous drawbacks.

For example, U.S. Pat. No. 7,396,461 of Bommi et al. describes a dome shaped filter cartridge created using an ultrahigh molecular weight polyethylene (UHMPE) binder impregnated with small pore size activated carbon particles. This cartridge is used in a filter having a receptacle, and lacks portability or immediacy of use.

Likewise, U.S. Pat. No. 6,368,504 of Kuennen describes a carbon block filter formed by bonding together an activated carbon mixture with a binder to form a carbon block. This carbon block is then encased in a nonwoven fabric material. Specifically, the patent disclosure calls for the carbon filter to be encased a non-woven plastic fabric, such as polypropylene. Kuennen describes using the carbon filter in a home treatment system, and as such is not portable.

These and other current devices and articles of the art lack the ability to provide a fluid filtering device that is compactable for personal transport and storage but also allows for a significant volume to be filtered and provided to a receptacle for immediate use. Therefore, what is needed in the art is a fluid filtering apparatus that has an expandable configuration that allows for the filtering of a serving size volume of fluid or more in rapid fashion and in an easily portable configuration.

SUMMARY OF THE INVENTION

In one arrangement of an apparatus described herein, a collapsible filter is provided that incorporates collapsible elements that allow for the apparatus to have a collapsed configuration and an expanded configuration. In the particular arrangement of elements, the expanded configuration allows for a large volume of fluid to be filtered rapidly into a drinking or storage receptacle without the need for specialized adaptors or interfaces. In an alternative configuration, the collapsed configuration allows the filter apparatus to be compacted and hence be easier to transport and store, especially within personal garments, such as handbags, suitcases and the like. In a further iteration, the filter apparatus uses wrapped carbon fiber filter disks to filter the fluid. In a further configuration, the filter body is equipped with a number of features and facets that reduces suction forces between the filter apparatus and a receptacle.

BRIEF DESCRIPTION OF THE DRAWINGS

The foregoing and other aspects, features, and arrangements of the invention can be appreciated from the accompanying drawing figures and discussion of certain embodiments of the invention, wherein the figures are as follows.

DETAILED DESCRIPTION OF CERTAIN EMBODIMENTS OF THE INVENTION

By way of overview and introduction, the present invention is directed to a collapsible filter apparatus 100 that includes a plurality of sections, configured to join to one another to form a filter apparatus that has collapsible features that render the apparatus alternatively transportable or configurable to retain a large body of fluid for filtering into a drinking vessel or storage container. Furthermore, the collapsible filter apparatus 100 includes a removable carbon wrapped filter element that allows for reusability or replicability. In one arrangement the fluid to be filtered is water. In alternative arrangements, other fluids can be used in conjunction with the apparatus described herein. The construction of the collapsible filter apparatus 100 is described below.

Figure 1:
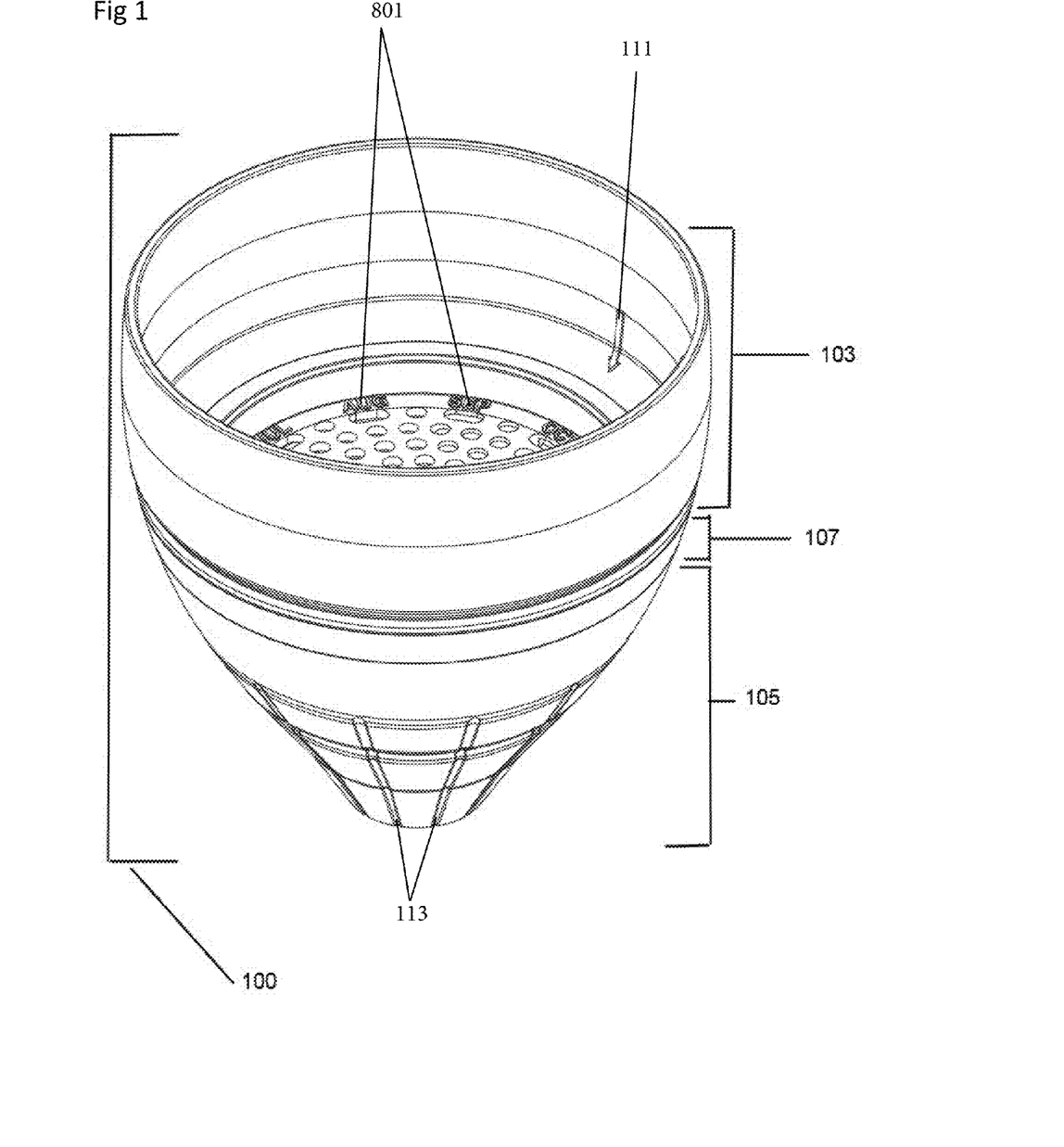
FIG. 1 is a perspective view of the collapsible filter apparatus in the expanded state in accordance with various embodiments of the present invention.

Turning to FIG. 1, an example of the collapsible filter apparatus 100 in the expanded (in use) configuration is provided. The entire collapsible filter apparatus 100 is light-weight, compact and portable and as illustrated, is intended for individual use. The illustrated collapsible filter apparatus 100 includes a foldable fluid retention portion 103 connected to a filtration assembly (unit) 107, which in turn is connected to a collapsible funnel element 105. These elements cooperate to communicate unfiltered fluid from the retention portion 103 through the filter and out through the funnel to an awaiting receptacle. While the dimensions of the apparatus are variable depending on intended use, in one configuration the filtering apparatus is capable of enabling the filtration of more than approximately one (1) gallon of fluid every two (2) minutes.

Figure 2:
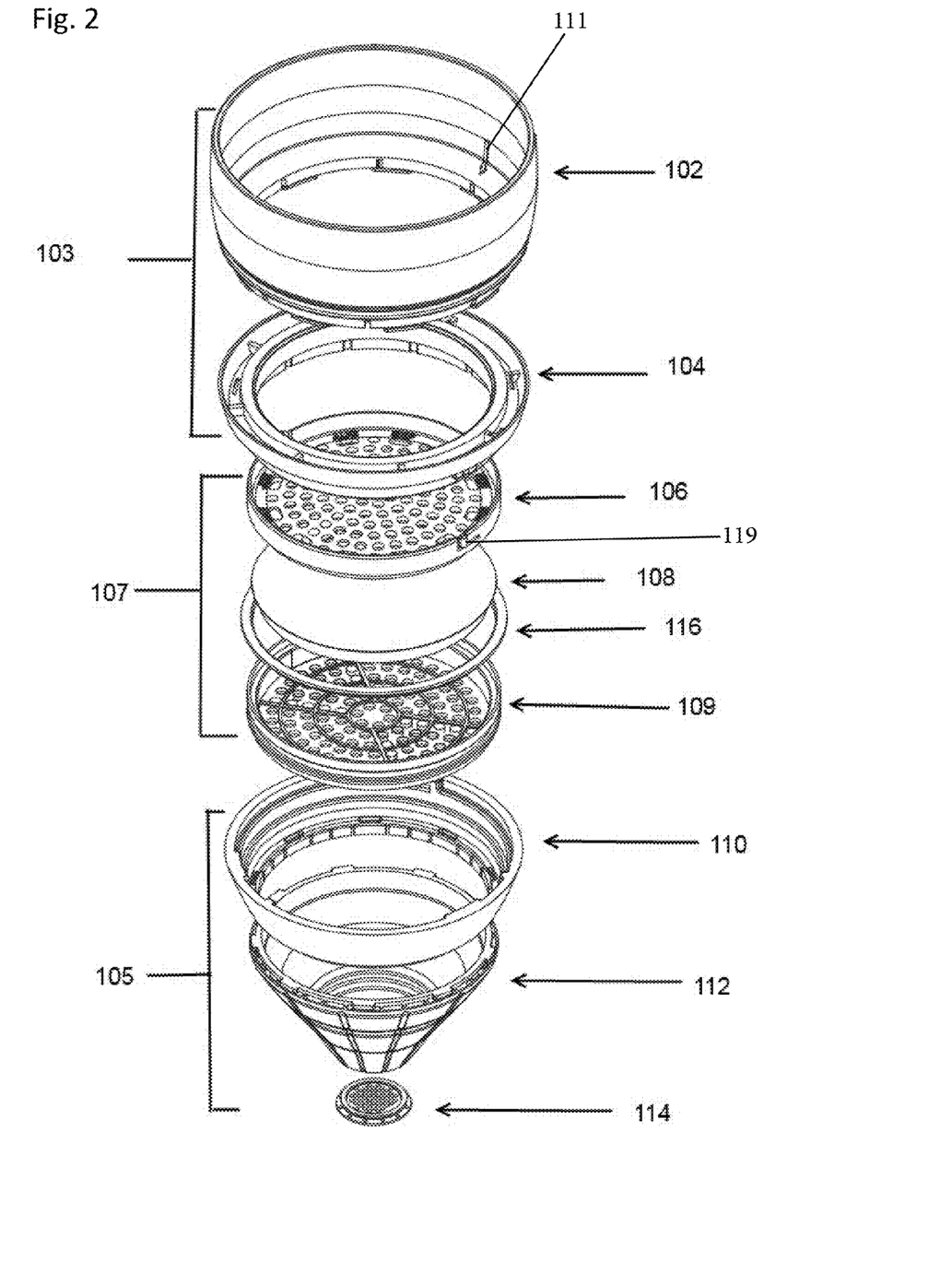
FIG. 2 is an exploded view of the collapsible filter apparatus in accordance with various embodiments of the present invention.

The elements of the apparatus describe can be seen in more detail in the exploded view of FIG. 2. Here, the foldable fluid retention portion 103 is formed of a number of individual elements. These include, but are not limited to a foldable container (foldable portion) 102 and a container adaptor 104. In the illustrated configuration, the foldable container 102 is formed of fluid impermeable, flexible material such that it is capable of retaining a quantity of fluid equal to the interior volume defined by the foldable portion while retaining a substantially cylindrical shape. In one non-limiting configuration, the foldable container 102 is configured to contain approximately 16 ounces of fluid in need of filtering.

In one configuration, the foldable container 102 is formed of rubber, plastic, natural or synthetic materials or fibers, or by a composite material incorporating various base components to provide the required characteristics. As provided in the accompanying illustrations, the foldable container 102 and the container adaptor 104 are secured to one another. For example, in the illustrated embodiment, the foldable container 102 is coupled to the container adaptor 104 using an overmold technique in that foldable container 102 is overmolded relative to the container adaptor 104 to form a permanent connection. It will be understood that other techniques can be used to connect the foldable container 102 to the adaptor 104. For example, a mechanical connection can be provided between these two parts to provide either a permanent or non-permanent connection.

The unfiltered fluid, when introduced into the foldable container 102 is retained within the walls of the foldable container 102 and migrates through the action of gravity, into the filter assembly 107 which lies below the foldable container 102. The filter assembly 107 is configured to connect the foldable portion 103 to the collapsible portion 105. In the illustrated configuration, the filter assembly 107 includes an upper encasement 106.

Figure 7:
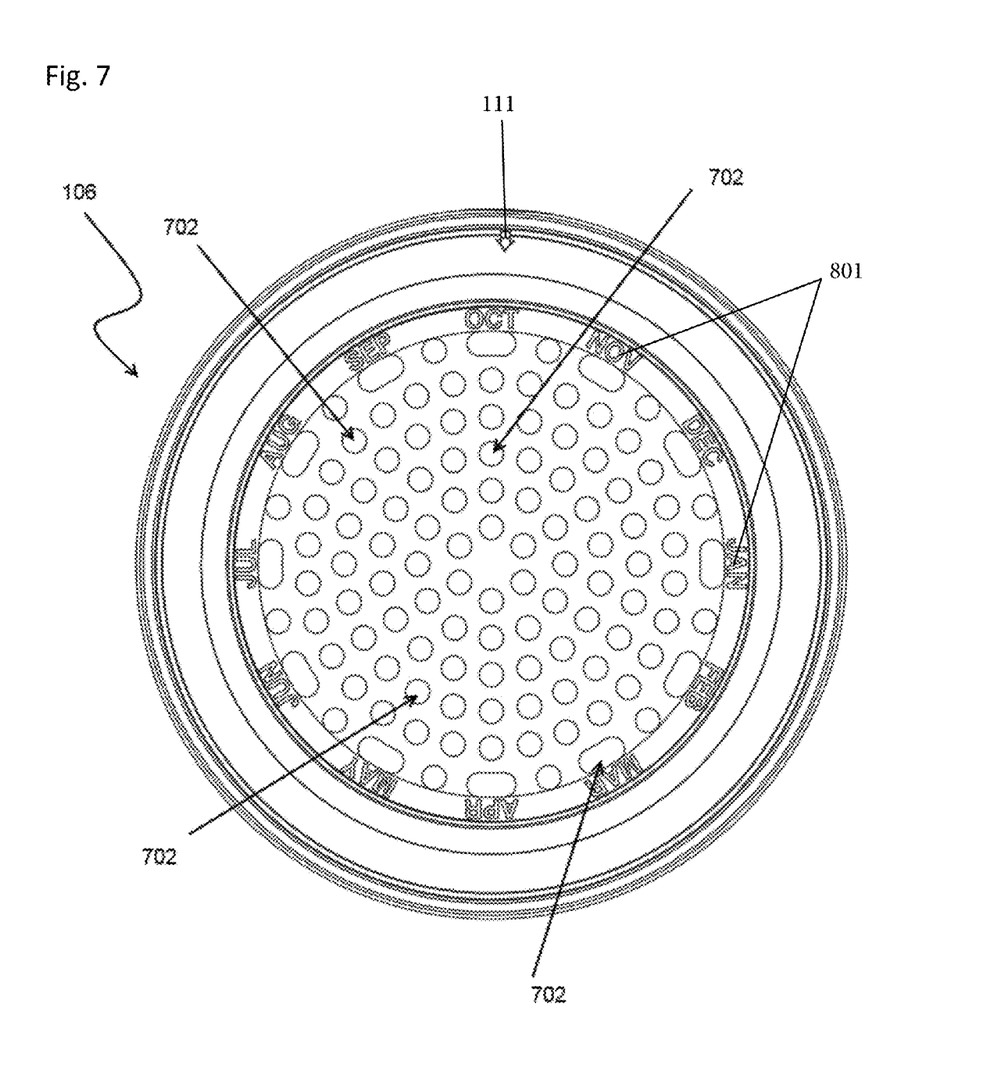
FIG. 7 is a top illustrative diagram of one element of the collapsible filter apparatus in accordance with various embodiments of the present invention.

As shown in more detail in FIG. 7, the upper encasement 106 is provided with a plurality of fluid inlets (holes) 702 that allow for fluid placed in contact with the upper encasement 106 to be transported to a filter cartridge (filter or filtration element) 108 that is part of the filter assembly 107. In one specific configuration of the filter apparatus illustrated, the upper encasement also includes a date disk 802. Here, the date disk provides abbreviations of the months of the year. Other indicators, such as months, days, years or other time indicators are envisioned and usable in the apparatus as described. The date disk 802 circumferentially surrounds the inlets 702.

Figure 8:
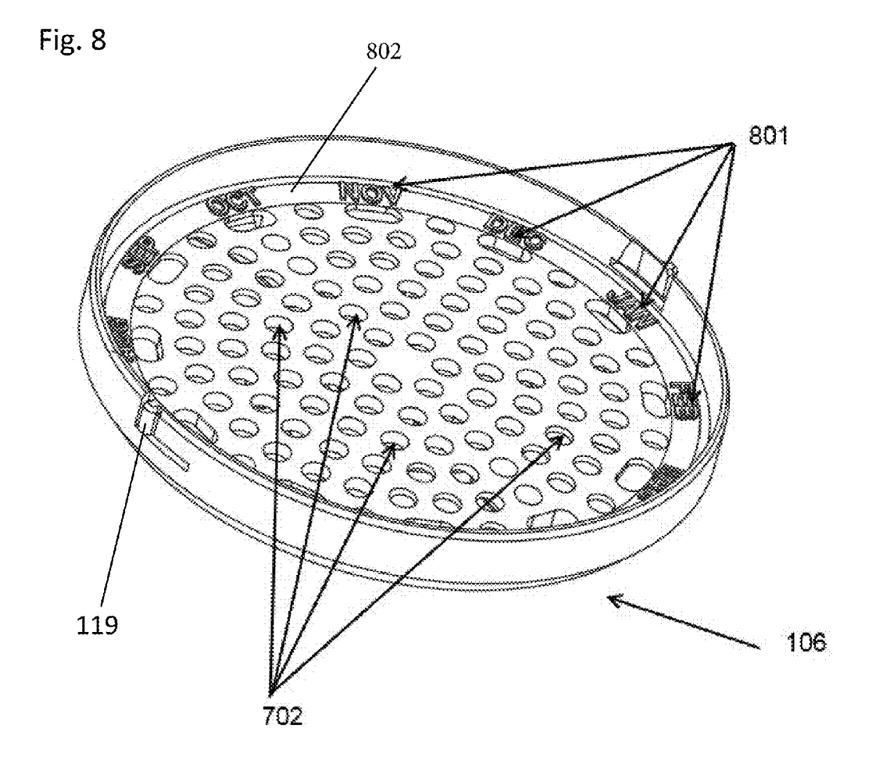
FIG. 8 is a top illustrative diagram of one element of the collapsible filter apparatus in accordance with various embodiments of the present invention.

The date disk 802, shown in more detail in FIG. 8 can be moved or altered to indicate the date that the cartridge was inserted into the filter, or to indicate a date in the further when the filter cartridge should be replaced with a fresh cartridge. This selectable date disk 802 allows the installation date of the filter cartridge 108 to be noted such that upon expiration of a natural lifespan of the filter cartridge 108, the filter cartridge 108 can be replaced.

As shown in FIGS. 1 and 2, the foldable container 102 includes an indicator 111 that is formed along an inner surface of the foldable container 102. More specifically, the indicator 111 can be in the form of a downward facing arrow that is formed along the inner surface of the foldable container 102. This indicator 111 is intended to point to month indicia 801 (abbreviations of the months formed circumferentially as part of the disk 802). As shown in FIG. 8, the upper encasement 106 includes one or more locking tabs 119 that mate with complementary slots or openings formed in the adaptor 104. The locations and number of tabs 119 and slots in the adaptor 104 are selected so that the upper encasement 106 can be positioned and locked relative to the adaptor 104 so that the indicator 111 points to the chosen indicia 801 (i.e., the abbreviation of one month). The tab 119 can be inserted into the slot and then rotate a distance to cause the tab 119 to assume a locked position.

In the provided configuration, the filter cartridge 108 is a carbon wrapped filter a replaceable fluid filter constructed from molded carbon fiber and silver. In one arrangement, the filter cartridge 108 is a carbon and silver composite filter material that is wrapped in a non-woven composite material composed of a food-grade, 50%/50% blend of polyethylene (PE) and polyethylene terephthalate (PET).

Figure 9:
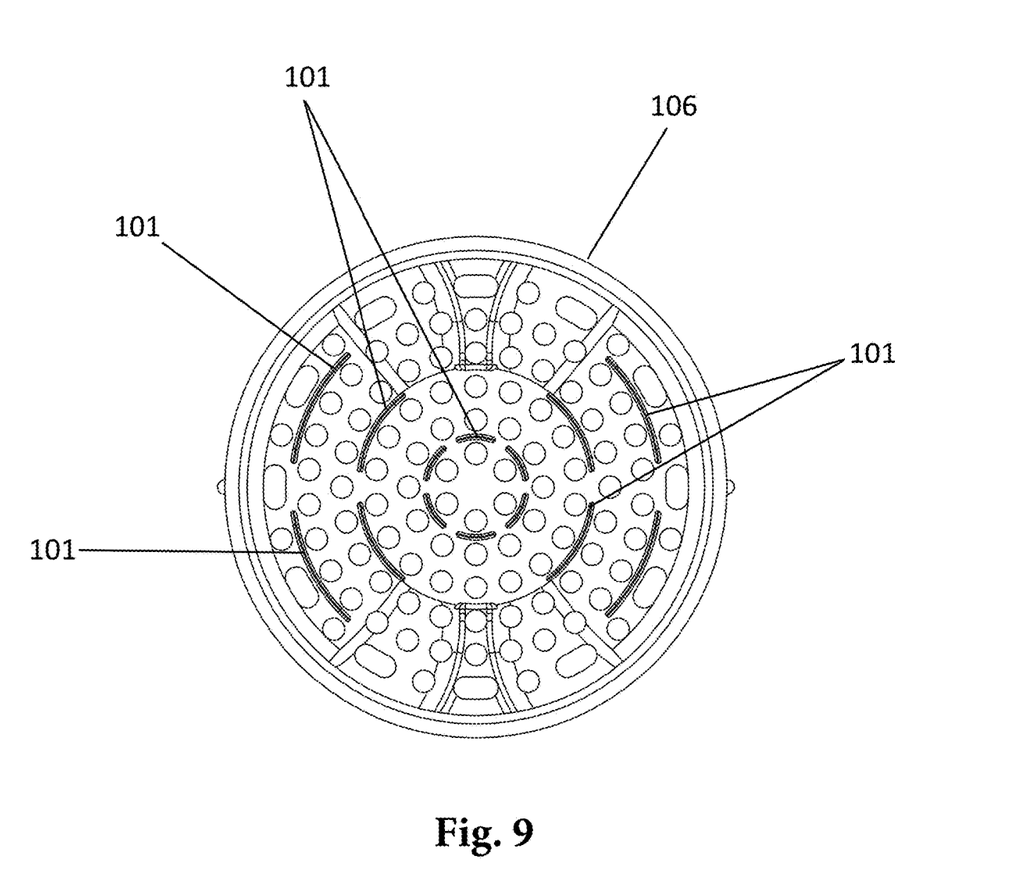
FIG. 9 is a bottom plan view of an upper encasement (upper housing) of a filter assembly for use in the collapsible filter apparatus.
Figure 10:
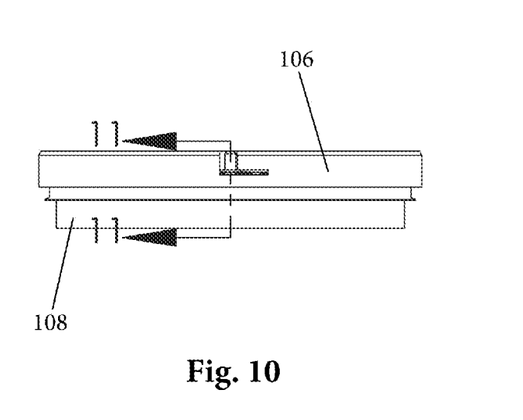
FIG. 10 is a side view of the filter assembly.
Figure 11:
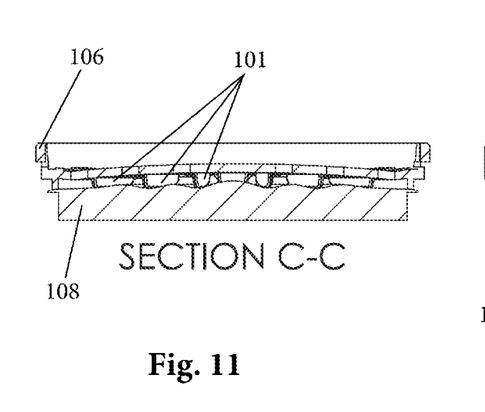
FIG. 11 is a cross-sectional view taken along the line 11-11 of FIG. 10.

As shown in FIGS. 9-11, the upper encasement 106 includes structures 101 that serve to contact and shape the filter cartridge 108. For example, the upper encasement 106 can include a plurality of ridges/ribs (protrusions) 101 formed on a bottom surface thereof for contacting an upper surface of the filter cartridge 108 to shape the filter cartridge into a predetermined shape. In the illustrated embodiment, the ridges 101 are configured to contact and apply pressure to the upper surface of the filter cartridge 108 so as to cause a deformation thereof. In particular, the ridges 101 cause the upper surface to assume a concave shape so as to cause a center portion of the upper surface of the filter cartridge 108 to be recessed relative to a peripheral portion of the filter cartridge 108 so as to promote fluid to flow toward the center of the filter cartridge 108 as opposed to the peripheral portion.

In the illustrated embodiment, the ridges 101 form a plurality of ridges 101 each of which can have an arcuate shape. The ridges 101 can be arranged to define an inner circle and a first set and a second set that can be formed of opposite the first set. The inner circle is formed of a plurality of arcuate segments that form a non-continuous structure and the first and second sets can be formed of arcuate segments. Each ridge 101 locally deforms the upper surface of the filter cartridge 108 by applying a force thereto to locally compress the top surface of the filter cartridge 108, thereby introducing concavity into the top surface of the filter cartridge 108.

Figure 3:
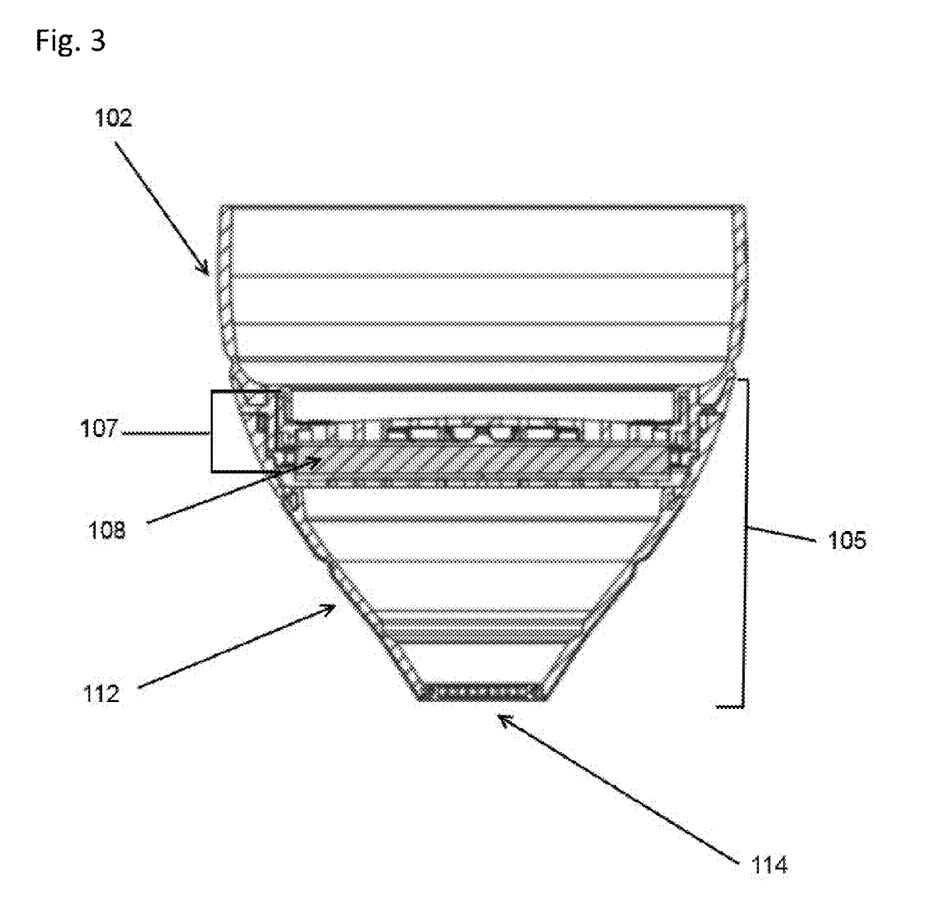
FIG. 3 is a side cutaway illustrative diagram of collapsible filter apparatus in accordance with various embodiments of the present invention.
Figure 6:
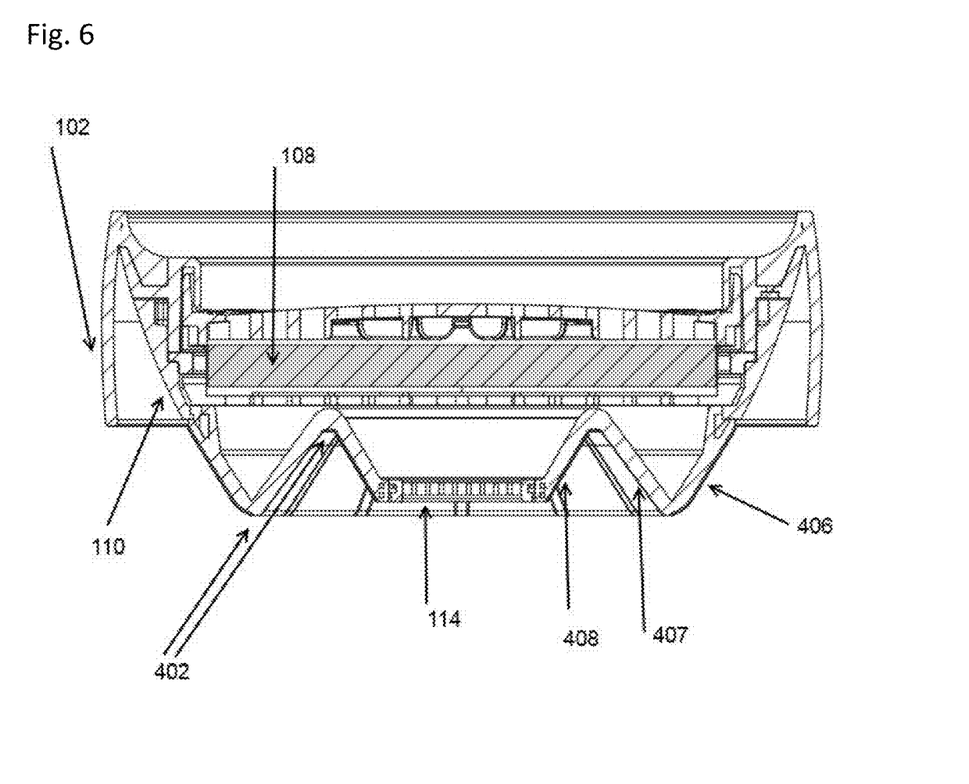
FIG. 6 is a cut-away illustrative diagram the embodiment of the invention in the collapsed configuration.

It will be understood that in FIGS. 3 and 6, the ridges 101 are not shown in contact with the filter element 108; however, this is only for illustration purposes and as shown in FIG. 11, when the parts are assembled for normal use, the ridges 101 contact and apply pressure to the upper surface of the filter element 108 as discussed herein and locally deform such surface (i.e., impart concavity thereto).

In the illustrated configuration, the carbon filter 108 is disposed within a lower enclosure (lower encasement) 109. The lower enclosure 109 include a channel in which a gasket 116, such as a silicone gasket, is disposed. Gasket 116 provides a seal between mating parts. The lower enclosure 109 is also equipped with openings that allow for fluid that has passed through the filter cartridge 108 to exit the filter element 107 and descend to the collapsible element 105.

In a particular arrangement, the lower enclosure 109 is configured to couple to the upper encasement 106 and provide a substantially fluid impermeable encasement for the filter cartridge 108. In a particular arrangement the entire filter element 107 is replaceable or disposable. Alternatively, only the filter cartridge 108 is disposable. The lower enclosure 109 of the filter element is coupled to the collapsible portion 105 of the filter apparatus. For example, a mechanical fit (attachment) can be provided between the lower enclosure 109 and the collapsible portion 105 and in the present invention, the lower enclosure 109 is pressure fit (friction fit) into a filter adaptor 110.

As shown in more detail in FIG. 3, the filter element 107 is secured, at least partially, within the collapsible filter portion 105. In the illustrated configuration, both the collapsible portion 105 and the foldable portion 103 are fully extended.

With further reference to FIG. 2, the collapsible portion 105 includes the filter adaptor 110, a collapsible fluid funnel 112 and a flow control device 114. As mentioned above, the filter adaptor 110 is coupled to the lower enclosure 109 (e.g., as by a pressure fit (friction fit—mechanical attachment). The adaptor 110 is in turn connected to the collapsible funnel element 112. For example, the adaptor 110 can be coupled to the funnel element 112 using a number of different techniques, including the use of a mechanical fit and in the illustrated embodiment, an overmold process is used to attach the adaptor 110 to the funnel element 112. For example, the funnel element 112 can be overmolded over the adaptor 110. Similarly, the funnel element 112 can be coupled to the flow control device 114 using a number of different techniques, including the use of a mechanical fit and in the illustrated embodiment, an overmold process is used to attach the funnel element 112 to the flow control device 114. For example, the funnel element 112 can be overmolded over the flow control device 114.

The collapsible funnel element 112 is designed to direct filtered fluid exiting the filter element 107 into a container or drinking receptacle. The collapsible filter element 112 is in one arrangement, substantially conical in shape. However, other specific geometries are also envisioned. The filter is formed of a collapsible, substantially fluid impregnable material, such as plastic, rubber, synthetic or natural fibers, or a composite material having intrinsically, or by application or coating, the necessary and inherent properties described herein.

Figure 4:
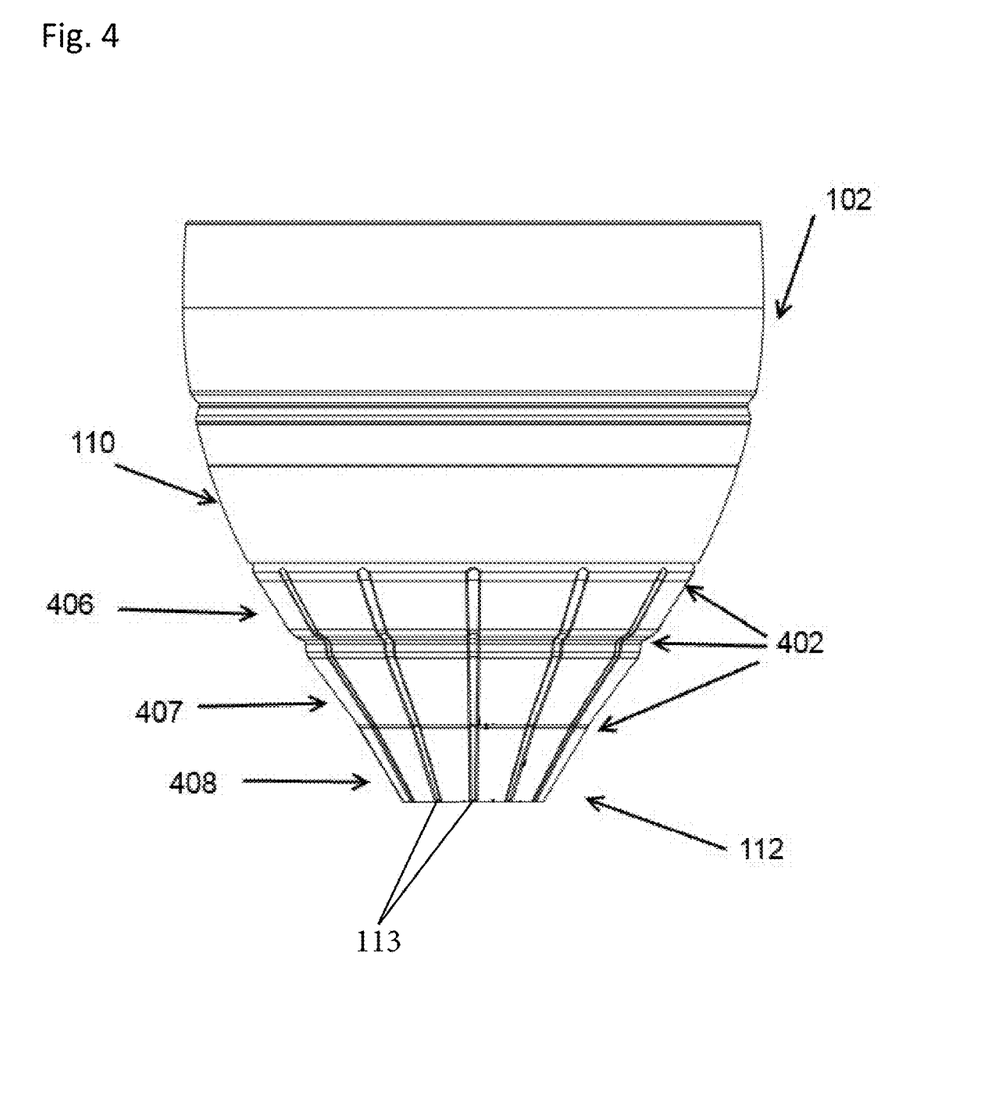
FIG. 4 is a side view of the collapsible filter apparatus in accordance with various embodiments of the present invention.

Provided in more detail in FIG. 4, the funnel element 112 is equipped with at least one vent/vacuum release channel(s). These relief channels allow for air to escape the drinking receptacle when fluid is being stored within the receptacle. Without the relief channels, the air pressure exerted on the funnel makes removal of the funnel and speedy flow difficult. The vent can have any number of structures so long as the vent allows fluid to flow therein and vent from the receptacle. For example, the vent can be in the form of a recessed channel shown at 113. The vent is not limited to being in the form of a channel but instead can have other forms including a recess having other shapes, such as a dimple or other recess formed in the outer surface of the funnel element 112. In other words, the vent is formed by a recessed portion of the funnel element 112 which allows fluid to vent when the funnel element 112 is inserted into and makes contact with the wall of the receptacle. In a different embodiment, the recess portion 113 an take the form of a plurality of recesses that can be arranged in spaced rows that extend at least partially circumferentially about the funnel element 112. For example, the recess portions 113 do not have to be formed along the entire circumference of the funnel element 112 but can be limited to one or more portions of the funnel element 112. The funnel element 112 has a frustoconical shape. When the apparatus 100 is inserted into a receptacle such as a cup, the funnel element 112 is inserted and lies within the cup since the funnel element 112 represents the lowermost portion of the apparatus. Thus and it is intended that the funnel element 112 will make contact within the cup and by having a series of recesses 113 (in the form of channels or the like) that are recessed relative to the rest of the outer surface of the funnel element 112, the recesses 113 lie inward relative to the inner surface of the cup, thereby creating a series of vents (channels)—i.e., vacuum release channels 113. By eliminating the presence of an unwanted vacuum seal between funnel element 112 and the cup, the apparatus 100 can be inserted and removed with relative ease.

Additionally, the collapsible funnel is equipped with number of circumferential crease(s) 402 defining a plurality of collapsible sections 406, 407 and 408, each section having a decreasing diameter and corresponding interior volume. These creases 402 provide a predetermined folding point for collapsing the funnel 112 into the interior space of the filter adaptor element 110.

Continuing with FIG. 2, the flow control device 114 is configured to moderate the flow of filtered liquid from the filter assembly 107 into a storage receptacle. In the illustrated configuration, the relative diameters of the flow control deice 114 and the filter adaptor 110 are such that a fluid will begin to accumulate into the collapsible funnel during operation. As such, the collapsible funnel is formed of a fluid impermeable substance that is flexible enough to be folded but resilient enough to maintain a substantially conical shape.

The flow control device 114 is preferably carefully constructed so as to optimize (maximize) the flow rate of the fluid being discharged from the apparatus 100 and into the storage receptacle. More specifically, the number of holes in the flow control device 114, the location of the holes 114 and the dimensions of each hole are preferably selected so as to maximize the flow rate of the fluid.

Figure 5:
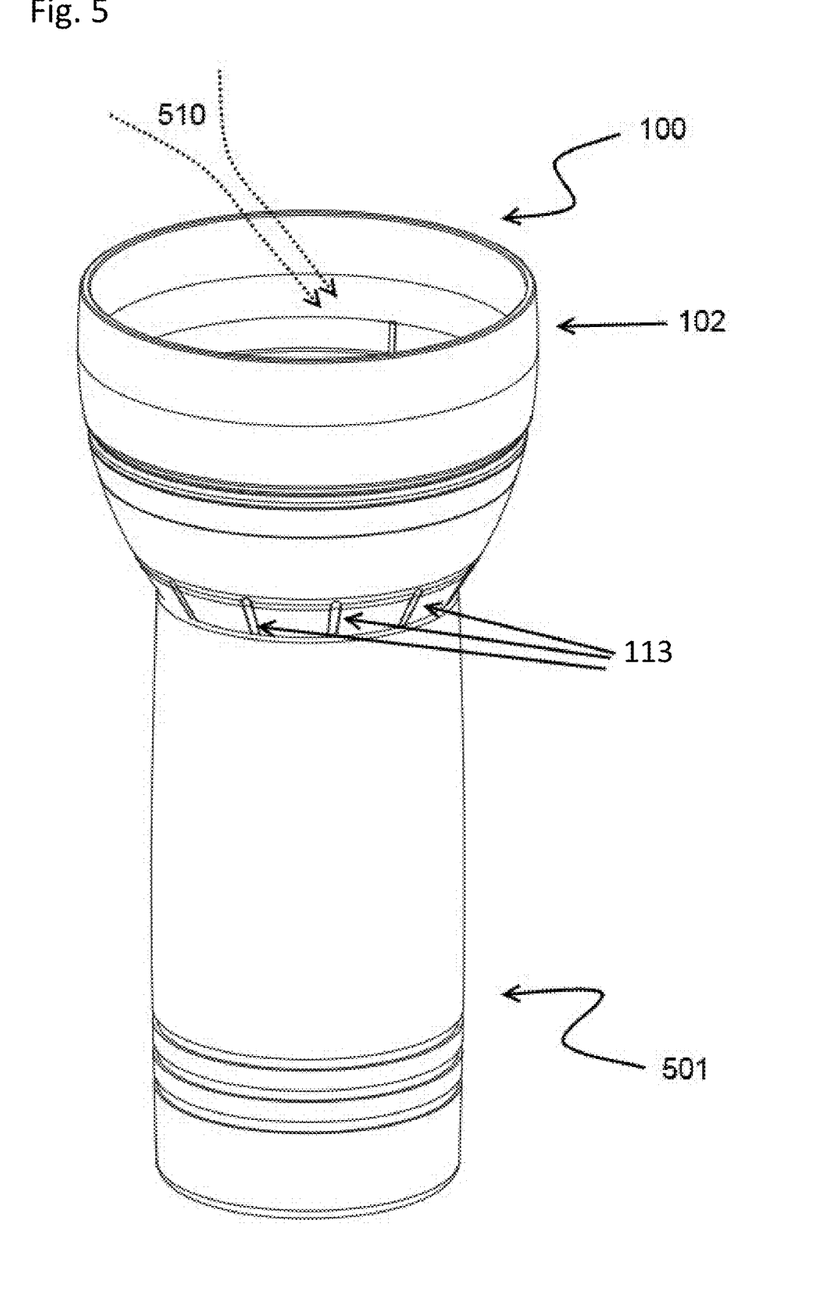
FIG. 5 is a side illustrative diagram of collapsible filter apparatus in accordance with one particular embodiment of the present invention.

FIG. 5 illustrates the collapsible filter apparatus 100 in the expanded configuration and placed in close communication with a fluid receptacle 501. Here, the collapsible filter apparatus 100 is inserted into an opening of the receptacle 501. A user provides a fluid 510 desired to be filtered, such as water, to the opening of the filter apparatus 100. In the provided configuration, the opening of the filter apparatus is the foldable container 102. The fluid passes through the filter assembly 107, and exits from the filter apparatus 100 as filtered fluid.

FIG. 6 presents the filter apparatus 100 in the collapsed state. Exerting pressure on the funnel element 112 causes the funnel element 112 to fold inward along the creases(s) 402. In one arrangement the collapsible funnel element 112 is collapsed such collapsible sections 407 and 408 are stored within the interior volume of the largest collapsible section, i.e. 406. However, in an alternative configuration, only the bottommost section, (i.e. 408) is secured within the interior volume of the next largest collapsible section. In yet a further arrangement, each section defined by the funnel creases 402 (i.e. 408, 407, 406) are secured within the interior volume of the filter adaptor element 110.

Also shown, the foldable container 102 is in the folded state. Here, the flexible material of the foldable container is folded over such that an external surface of the flexible material is in close proximity to the external surface of the funnel adaptor 110. As shown in FIG. 6, the folded over top edge of the container 102 can be in close proximity to a top edge of the funnel element 112. In this configuration, the overall dimensions of the filter apparatus are reduced. Thus, a more compact and portable fluid filter apparatus are provided.

It will therefore be appreciated that the collapsible fluid filter apparatus 100 of the present invention can include two different mechanisms for causing the apparatus 100 to move between the fully extended (in use) position and the fully collapsed storage position. More specifically, as described herein the upper portion above the filter assembly (i.e., the foldable container portion 102) changes its footprint and more specifically, is reduced in height by a folding action in which it folds over itself to an inverted position which is held. As shown in FIG. 6, the top edge of the foldable container 102 represents the top edge of the product in the fully extended (in use) position; however, in the fully collapsed position (FIG. 6), this top edge assumes a position that is generally in the middle of the fully collapsed product (proximate the filter assembly) due to the inversion of the foldable container 102. In addition, the collapsible funnel element 112 changes its footprint in a different manner in that the annular shaped creases formed therealong define weak points that allow the collapse of the funnel element 112. Thus, when the user applied an upward force to the flow control device 114, the funnel element 112 collapses in an accordion-like manner as shown in FIG. 6. As shown in FIG. 6, the filter assembly 107 acts as a stop and limits the extent of collapse of the funnel element 112. Since the creases 402 extend circumferentially around the funnel element 112, the funnel element 112 collapses in a set, predictable manner and this can result in the flow control device 114 being disposed internally within the collapsed funnel element 112. In other words and as shown in FIG. 6, the flow control device 114 does not represent the lowermost structure but instead is slightly nested within the collapsed funnel element structure. Based on the foregoing, when the collapsed apparatus 100 is placed on a flat support surface, such as a table, the flow control device 114 is not in contact with the flat support surface and therefore does not becomes soiled. In other words, the nesting of the flow control device 114 maintains the cleanliness of the flow control device 114 due to the flow control device 114 being spaced from the flat support surface.

The apparatus 100 can be easily transitioned between the fully extended position and the retracted storage position by either folding or unfolding the top portion and either collapsing or expanding the bottom portion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter of the present invention have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the fluid filter apparatus are not intended to be exhaustive or to limit the systems and methods described to the precise form disclosed. While specific embodiments of, and examples for, the apparatus are described herein for illustrative purposes, various equivalent modifications are possible within the scope of other fluid filtering articles and methods, as those skilled in the relevant art will recognize. The teachings of fluid filtering articles and methods provided herein can be applied to other fluid filtering devices and arrangements, not only for the apparatus and methods described above.

The elements and acts of the various embodiments described above can be combined to provide further embodiments. These and other changes can be made to the apparatus and methods in light of the above detailed description.

What is claimed is:

1. A collapsible fluid filter apparatus comprising:
   an upper portion that is configured to be positioned in a fully extended position and a folded position in which the upper portion has reduced height, the upper portion being configured to receive a fluid to be filtered;
   a filter assembly disposed below and coupled to the upper portion for receiving the fluid from the upper portion, the filter assembly including a filter element that is configured to filter the fluid; and
   a lower portion coupled to the filter assembly and configured to be positioned in a fully extended position and a fully collapsed position in which the lower portion has reduced height, the lower portion configured to be inserted into a receptacle for transferring the fluid filtered by the filter element to the receptacle;
   wherein the filter assembly includes an upper encasement that includes a plurality of inlet openings and is disposed above the filter element and a lower encasement that includes a plurality of outlet openings and is disposed below the filter element.

2. The collapsible fluid filter apparatus of claim 1, wherein in the folded position the upper portion is folded over on top of itself.

3. The collapsible fluid filter apparatus of claim 1, wherein at least a top portion of the upper portion is formed of a flexible material that can be folded over in a direction toward the filter assembly and maintains the folded position.

4. The collapsible fluid filter apparatus of claim 1, wherein the upper encasement comprises an annular shaped perimeter portion that includes date indicia formed circumferentially around the plurality of inlet openings.

5. The collapsible fluid filter apparatus of claim 4, wherein the date indicia comprises raised abbreviations for each month of a year and the upper portion includes a fixed indicator that is for positioning adjacent a selected one of the raised abbreviations.

6. The collapsible fluid filter apparatus of claim 5, wherein the upper encasement is configured to be attached to the upper portion in one of a plurality of different positions to allow the positioning of the fixed indicator adjacent the selected one of the raised abbreviations.

7. The collapsible fluid filter apparatus of claim 5, wherein the fixed indicator comprises a downward facing arrow.

8. The collapsible fluid filter apparatus of claim 1, wherein the filter element comprises a filter cartridge that comprises a carbon filter constructed from molded carbon fiber and silver.

9. The collapsible fluid filter apparatus of claim 1, wherein the lower portion comprises a funnel element having a frustoconical shape.

10. The collapsible fluid filter apparatus of claim 9, wherein the funnel element includes at least one vent that is configured to evacuate air from the receptacle when the apparatus mates with the receptacle for transferring the filtered fluid to the receptacle.

11. The collapsible fluid filter apparatus of claim 10, wherein the upper portion has at least one rib formed on a bottom surface thereof for forming at least one recess in an outer surface of the funnel element.

12. The collapsible fluid filter apparatus of claim 1, wherein the upper portion has a variable volume with the fully extended position defining a maximum volume and the folded position defining a minimum volume and the lower portion has a variable volume with the fully extended position defining a maximum volume and the fully collapsed position defining a minimum volume.

13. The collapsible fluid filter apparatus of claim 1, wherein in the folded position, a top edge of the upper portion surrounds the filter assembly.

14. The collapsible fluid filter apparatus of claim 1, wherein a bottom surface of the upper encasement includes a plurality of protrusions that contact and locally deform an upper surface of the filter element to define a flow path for the fluid to be filtered.

15. The collapsible fluid filter apparatus of claim 14, wherein the plurality of protrusions are arranged so as to deform the upper surface of the filter element such that a central portion of the filter element is lower than an outer peripheral edge of the filter element to promote flow of the fluid to be filtered toward the central portion.

16. A collapsible fluid filter apparatus comprising:
an upper portion that is configured to be positioned in a fully extended position and a folded position in which the upper portion has reduced height, the upper portion being configured to receive a fluid to be filtered;
a filter assembly disposed below and coupled to the upper portion for receiving the fluid from the upper portion, the filter assembly including a filter element that is configured to filter the fluid; and
a lower portion coupled to the filter assembly and configured to be positioned in a fully extended position and a fully collapsed position in which the lower portion has reduced height, the lower portion configured to be inserted into a receptacle for transferring the fluid filtered by the filter element to the receptacle;
wherein the filter element comprises a filter cartridge that comprises a carbon and silver composite filter material that is wrapped in a non-woven composite material composed of a food-grade, 50%/50% blend of polyethylene (PE) and polyethylene terephthalate (PET).

17. A collapsible fluid filter apparatus comprising:
an upper portion that is configured to be positioned in a fully extended position and a folded position in which the upper portion has reduced height, the upper portion being configured to receive a fluid to be filtered;
a filter assembly disposed below and coupled to the upper portion for receiving the fluid from the upper portion, the filter assembly including a filter element that is configured to filter the fluid; and
a lower portion coupled to the filter assembly and configured to be positioned in a fully extended position and a fully collapsed position in which the lower portion has reduced height, the lower portion configured to be inserted into a receptacle for transferring the fluid filtered by the filter element to the receptacle;
wherein the lower portion comprises a funnel element having a frustoconical shape;
wherein the lower portion comprises a filter adaptor which matingly attaches to the filter assembly and the funnel element is securely attached to the filter adaptor, the funnel element being configured to collapse internally and in an accordion-like manner.

18. The collapsible fluid filter apparatus of claim 17, wherein the funnel element includes one or more creases which define points at which the funnel element collapses internally.

19. The collapsible fluid filter apparatus of claim 18, further includes a flow control device disposed at a bottom open end of the funnel element and in the fully collapsed position, the flow control device is disposed internally within the collapsed funnel element.

20. The collapsible fluid filter apparatus of claim 17, wherein at least a portion of the filter assembly is disposed within a hollow interior of the filter adaptor.

* * * * *